April 30, 1940.   C. W. LINDSTROM   2,199,264

COMBINED WARNING AND INDICATING SIGNAL

Filed Oct. 19, 1936   3 Sheets-Sheet 1

INVENTOR
CHARLES W. LINDSTROM
By *Eric Oschinger*
Attorney

April 30, 1940. C. W. LINDSTROM 2,199,264
COMBINED WARNING AND INDICATING SIGNAL
Filed Oct. 19, 1936 3 Sheets-Sheet 2
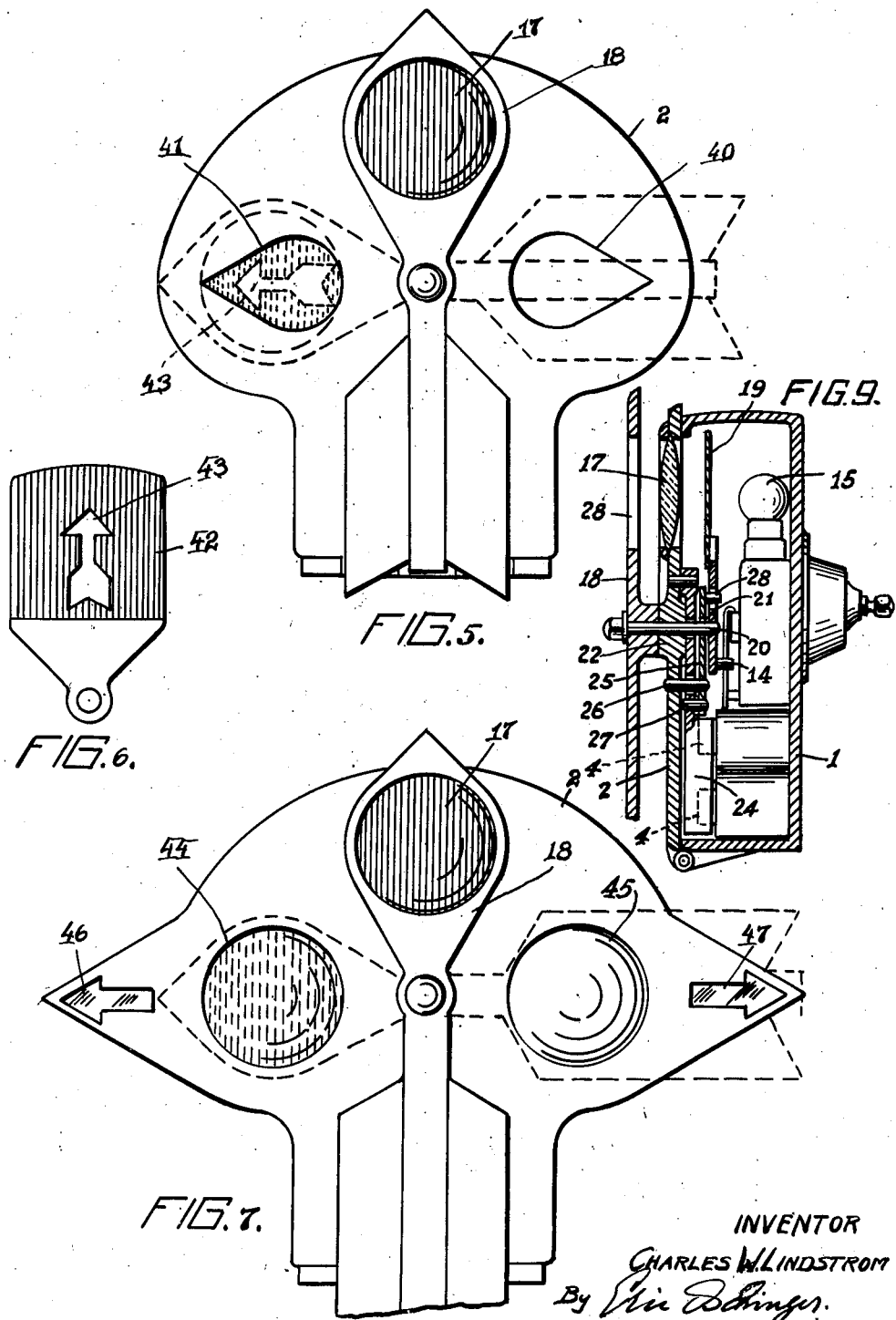
INVENTOR
CHARLES W. LINDSTROM
By
Attorney April 30, 1940. C. W. LINDSTROM 2,199,264
COMBINED WARNING AND INDICATING SIGNAL
Filed Oct. 19, 1936 3 Sheets-Sheet 3

INVENTOR
CHARLES W. LINDSTROM
By [signature]
Attorney

Patented Apr. 30, 1940

2,199,264

UNITED STATES PATENT OFFICE 2,199,264

COMBINED WARNING AND INDICATING SIGNAL

Charles W. Lindstrom, Rochester, N. Y.

Application October 19, 1936, Serial No. 106,274

5 Claims. (Cl. 177—327)

This invention relates to automobile direction signals and has for one of its objects to combine a novel direction signal with a novel warning signal which automatically gives a warning prior to making a turn and then indicates the direction of the turn the vehicle is about to make.

Another object of this invention is to provide an efficient combined warning and direction signal for both day and night driving.

A further object of this invention is to provide a combined warning and direction signal which automatically gives a continuous warning signal during the time the brakes are applied or until the driver operates the direction signal to indicate the turn he is about to make.

These and other objects and attendant advantages of the invention will become more readily apparent from the detailed description which follows, reference being had to the accompanying drawings in which Figure 1 is a front elevation of the combined warning and direction signal.

Figure 5 is a front elevation of a modified form of the combined warning and direction signal.

Figure 6 is a detail front elevation of the color screen used in the signal illustrated in Figure 5.

Figure 7 is a front elevation of another modified form of the combined warning and direction signal.

Figure 9 is a cross section taken along a line passing in a plane parallel to the paper and through the axis of pointer 18.

In the several figures of the drawings like reference numerals indicate like parts.

The combined warning and direction signal forming the subject matter of my present invention is adapted to fill the need for an efficient warning signal for both day and night driving and combine with this warning signal a direction signal that when operated will efficiently indicate both during the day and at night the direction or turn the driver is about to make with the car.

The signal comprises the housing 1 which has pivotally attached thereto the cover 2 by means of the hinge 3 located at the bottom of both the housing and the cover. In the housing is mounted the operating mechanism for the signal and on the inside of the cover is mounted the signaling mechanism proper which is so arranged that by swinging the cover over the casing and locking it thereto the operating and signaling mechanisms are operatively connected to each other.

Figure 3:
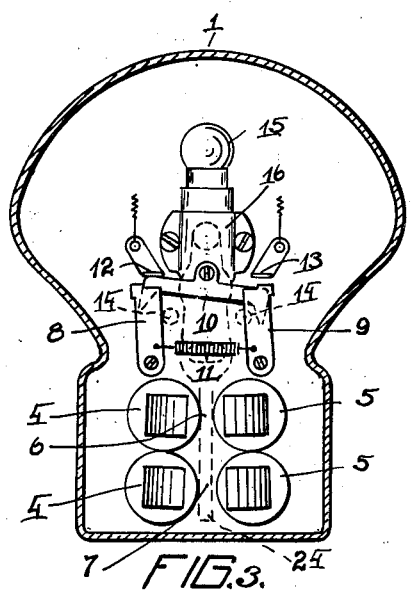
Figure 3 is a vertical sectional view of the warning and direction signal taken on the line 3x—3x of Figure 2.
Figure 4:
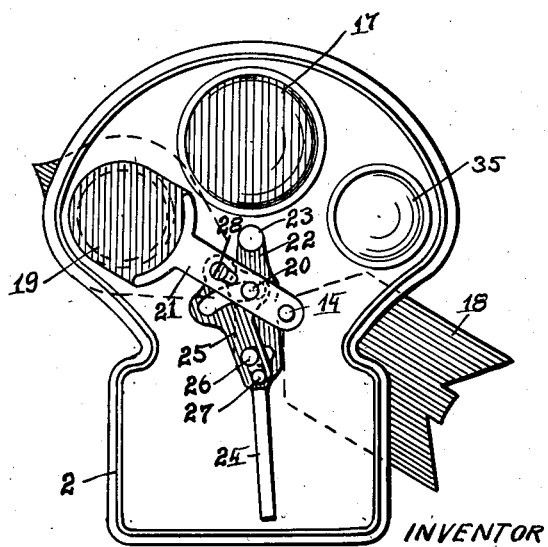
Figure 4 is a rear elevation of the cover of the signal and the mechanism mounted thereon.

The operating mechanism includes two pair of electromagnets 4, 4 and 5, 5 which are located in the lower portion of the housing 1 and have suitable magnet cores which project to face each other so as to provide the magnetic gaps 6 and 7 between them. For the warning signal the magnets are alternately energized by means of the switch located above the magnets and comprising the swinging arms 8 and 9 which normally are drawn together and against the ends of the rocker arm 10 by means of the spring 11. The ends of the rocker arm 10 alternately make contact with the electric contact members 12 and 13 so as to close the electric circuit between the rocker arm and first one and then the other of the contact members in order to energize first one pair and then the other pair of the electromagnets 4 and 5. The operation of the switch is caused by a pin 14 which is carried by the signaling mechanism and is located so as to swing back and forth between the arms 8 and 9 into the positions indicated in dotted lines in Figure 3. The pin 14 contacts the swinging arms 8 and 9 and in so doing moves each arm out of engagement with and away from the end of the rocker arm so as to release the end of the rocker arm and cause the spring 11 to pull the other swinging arm in the same direction and in doing so rocks the rocker arm to move away from one of the contact members and into contact with the other contact member. In this way the laterally swinging pin 14 causes the magnet pairs to be alternately energized for a purpose that will presently appear.

The light source for the light signal of the warning and direction signal is furnished by the incandescent light 15 which is mounted in a suitable socket provided in the bracket 16 so as to be held in a predetermined position with relation to the tail light lens 17 in the cover 2.

The signaling mechanism proper which, as above pointed out, is carried by the cover 2 includes the swinging arrow shaped indicator 18 located on the outside of the cover and the swinging color screen 19 located on the inside of the cover. The arrow shaped indicator is mounted on the rocking shaft 20 which extends thru the cover and has mounted thereto on the inside of the cover the swinging arm 21 which carries the color screen 19. Both the indicator arrow and the color screen are thus mounted to swing in unison and their operation is caused by the arm 22 which is pivoted at 23 on the inside of the cover. The lower portion of the arm 22 provides the armature 24 for movement by the magnets 4 and 5 in the magnetic gaps 6 and 7.

The movement of the arm 22 is transmitted to the color screen and indicator arrow to cause these to swing in an arc considerably greater than the arc described by the arm 22, by means of the lever 25 which is pivoted at 26. A pin 27 carried by the arm 22 engages the lower short end of the lever 25 for movement thereby while the long upper end of the lever 25 engages the arm 21 by means of the pin 28. Both the arm 22 and lever 25 are suitably cut out to provide for their free movement without interference by the stationary pivot members 20 and 26.

Figure 2:
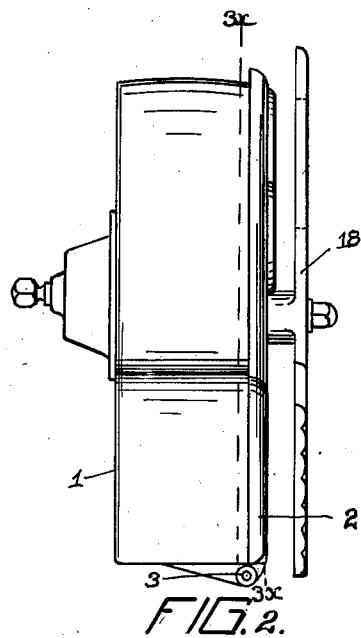
Figure 2 is a side elevation thereof.
Figure 1:
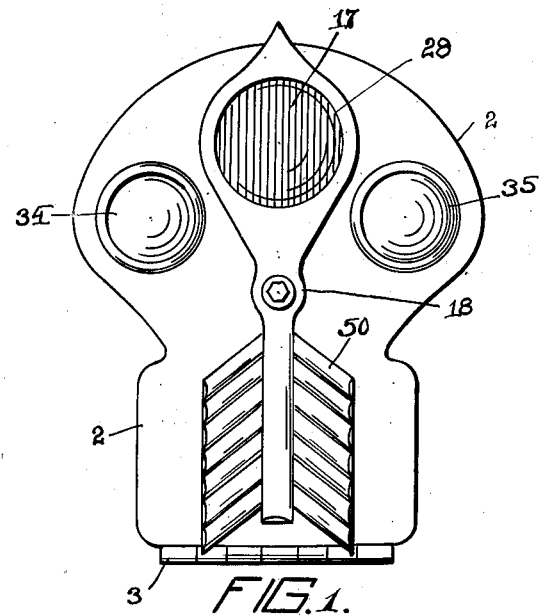

The armature 24 which, as above described, forms part of the lever 22, is normally located in the middle of the magnetic gaps 6 and 7, in which position it holds the indicator arrow 18 in the vertical position illustrated in Figure 1, and the color screen 19 in back of the tail light lens 17 and between it and the incandescent light 15. This is the normal inoperative position in which only the tail light shows its red light thru the opening 28 provided in the head of the indicator arrow.

The mechanism of the combined warning and indicator signal so far described is supplemented by the double contact switch 29 and the single contact switch 30. The first of these is provided with the contacts 31 and 32 which are connected in the circuits of either one or the other pair of magnets 4 and 5. The switch is arranged so that when its handle is operated with a movement to the right, the pair of magnets which swing the indicator arrow to the right is energized and when the handle of the switch is operated with a movement to the left the pair of magnets which swing the indicator to the left is energized. In this way the operator of the vehicle, by moving the switch handle in the direction in which he is about to turn, will operate the indicator so as to point in the same direction and indicate in advance to those in front and back the turn he is about to make with the vehicle.

The single contact switch 30, when operated, closes a circuit which includes the switch 10 and alternately energizes first one and then the other of the pair of magnets. The switch is operatively connected to the brake pedal 33 so that when the brakes of the vehicle are applied the switch 30 is automatically operated to close the circuit thru a contact of the switch 10 which energizes one pair of magnets and causes the indicator arrow to swing in one direction. The movement of the indicator arrow however opens the circuit and closes the circuit which energizes the other pair of magnets to swing the indicator back in the opposite direction. Opening and closing of these circuits by the switch is accomplished by the pin 14 which is carried by the arm 21 and during the last part of the movement thereof in either direction engages and moves either one or the other of the arms 8 and 9. This, as above pointed out, causes the switch 10 to open one circuit and close the other in order to alternately energize first one pair and then the other pair of magnets while the brake pedal 33 is being depressed. In this way the application of the brakes causes the indicator arrow 18 to oscillate and give warning that the vehicle is slowing down to stop or to make a turn. After the vehicle has slowed down and the driver is ready to make the turn, he operates the switch 29 in the direction of the turn he is about to make and in so doing closes the circuit which includes the magnets for operation of the indicator arrow in the same direction. This pair of magnets thus energized then hold the indicator arrow in this position in order to indicate the direction in which the vehicle is about to turn. After the turn is made the release of the brakes automatically opens the switch 30 while the operator opens the switch 29 whereby all of the magnets are de-energized to cause the armature 24 to move into a central or neutral position between the magnetic gaps 6 and 7 and hold the indicator in the vertical position illustrated in Figure 1.

To make the warning and indicating signals of the indicator arrow visible at night, the red tail light lens 17 is supplemented by two clear lenses 34 and 35, each of which is angularly spaced from the tail light lens so that the opening 28 in the head of the indicator arrow is in line with either the one or the other of these lenses when pointing to the right or the left of the tail light. As heretofore described, a color screen which is preferably red, moves in unison with the indicator arrow directly behind the cover 2 so that this color screen is interposed between the light within the housing and the lens. When the indicator arrow is therefore located in front of one of the clear lenses the light from within the housing is filtered thru the red filter so that only red light rays can pass thru this clear lens and the opening in the indicator arrow head. In this way the oscillation of the indicator arrow is supplemented at night by an alternate flashing of red and white light thru the clear lenses 34 and 35 and the opening in the indicator head while the fixed direction signal given by the indicator arrow is supplemented by having the clear lens located behind the indicator arrow in indicating the direction, colored red.

In order that the driver of the vehicle may check the operation of the warning and indicating signal, check lights 36 and 37 are connected in the circuits of the magnets so as to flash on and off on the oscillation of the indicator arrow and indicate that the proper solenoids are energized for the operation of the indicator when the switch 29 is operated. These check lights, together with the switch 29, are conveniently located so that the lights may be readily observed by the driver and the switch conveniently operated by him.

A switch 38, located within easy reach of the driver of the vehicle, controls the incandescent lights 15 and the electric current for the operation of the lights and the magnets is furnished by the battery 39.

In Figure 5 I have illustrated a modified form of the combined warning and signal light. In this modification the clear lenses 40 and 41 are pointed in opposite directions and the color screen 42, which moves in unison with the indicator arrow, has a small arrow 43 cut out therein so that whenever the color screen is placed behind one of the clear lenses the lens, in addition to being colored, shows the arrow 43 in white light in the middle of the lens pointing in the same direction as the indicator arrow. In this form of signal the indicator arrow and its color screen swing in an arc of 180 degrees.

Another modification of the combined warning and direction signal is illustrated in Figure 7. In this modification the clear lenses 44 and 45 are supplemented by the arrow shaped lenses or windows 46 and 47. These lenses or windows point in opposite directions and are illuminated by light from the single incandescent light illustrated in Figure 3 or by additional incandescent lights located in back of each of the arrow shaped windows. The indicator arrow 18 in this case is proportioned so that when it points to either side, the arrow provided by these windows forms a continuation of the arrow head of the indicator. The color screen on the inside of the housing colors the lens located behind the opening in the arrow head thus combining at night a colored lens with an illuminated arrow to indicate the direction, while the clear lens and the illuminated arrow pointing in the opposite direction at the other side of the center of the housing is covered by the enlarged butt end of the indicator arrow as shown in dotted lines in Figure 7.

The indicator arrow 18 may be plain, as illustrated in Figures 5 and 6, or may be provided with reflecting prisms or lenses 50, as illustrated in Figure 1.

Figure 8:
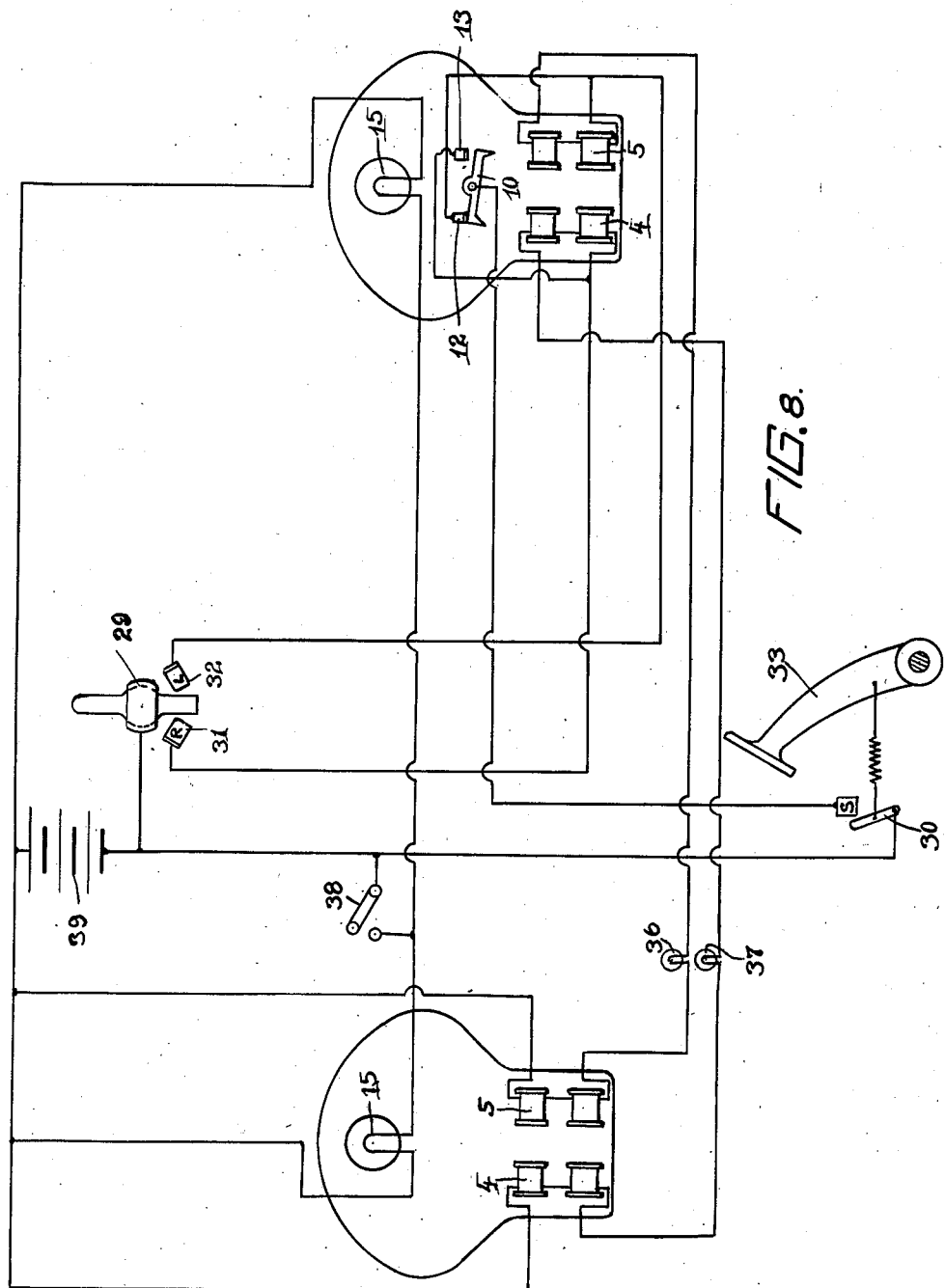
Figure 8 is a diagrammatic view of the electric connections of the combined warning and direction signal.

The combined warning and indicating signal is primarily intended for use at the rear of a vehicle. However, as illustrated in Figure 8, two such signals may be used, one at the front and the other at the rear of the vehicle. The one at the front may have all of the mechanisms or but a part thereof. For example, the oscillating motion may not be needed for the indicator at the front of the vehicle so that the indicator arrow will operate to simply indicate the turn the vehicle is about to make.

I claim:

1. In an indicator signal the combination of a housing having an open front, a cover hingedly mounted on said housing to open and close the front of said housing, electromagnets spacedly mounted in said housing so as to provide a magnetic gap between them, and an armature mounted to swing on the inside of said cover and located on said cover relative to the magnetic gap between the electromagnets in said housing so as to be moved into and out of said gap on the closing and opening of said cover.

2. An indicator signal comprising a housing, an indicator pivotally mounted on said housing, said housing having a plurality of openings concentrically arranged to the pivot of said indicator, lenses in said openings, a light source within said housing to have its light rays pass thru said lenses, means for swinging said indicator in front of said lenses, said indicator having an opening therethru adapted to move into and out of line with said lenses on the swinging movement thereof, means for normally holding said indicator with its opening in line with one of said lenses, a color screen mounted to swing within said housing in unison with said indicator on the outside thereof and in a position intermediate the light source and the lenses in the housing.

3. An indicator signal comprising a housing, a plurality of electromagnets mounted within said housing and arranged to provide a magnetic gap between them, an arm mounted to swing within said housing, an armature suspended from said arm within said magnetic gap, a rocking shaft projecting thru said housing, a lever arm mounted on said rocking shaft within said housing, an indicator arm mounted on said rocking shaft on the outside of said housing, a lever link mounted on said housing and connecting said swinging arm with said lever arm for movement of said rocking shaft and indicator arm by said swinging arm, said housing having a plurality of lens windows concentric to said rocking shaft, a color screen carried by said lever arm, and said indicator arm having an opening therethru in line with said color screen to cause the color screen and opening to move in line with the lens windows on the movement of said indicator arm.

4. An indicator signal comprising a housing, an indicator arm mounted to oscillate on said housing, a plurality of electromagnets for operating said indicator arm, an electric circuit for energizing said electromagnets, switch means operated on the movement of said indicator arm and controlling said electric circuit for intermittently energizing said electromagnets to cause said indicator arm to oscillate, second switch means for controlling said electric circuit to hold said indicator arm in a predetermined indicating position, a pair of lens windows in said housing, said indicator arm having an opening therethru to have said opening move over said lens windows, and a color screen movable within said housing in unison with said indicator arm so as to color the light passing thru the window lens and the opening in the indicator arm.

5. In an indicator signal the combination of a housing, a plurality of electromagnets mounted within said housing and arranged to provide a magnetic gap between them, an arm mounted to swing within said housing, an armature suspended from said arm within said magnetic gap, a rocking shaft projecting thru said housing, a lever arm mounted on said rocking shaft within said housing, an indicator arm mounted on said rocking shaft on the outside of said housing, a lever link mounted on said housing and connecting said swinging arm with said lever arm for movement of said rocking shaft by said lever arm to cause the limited movement of said armature within said magnetic gap by said electromagnets to provide both said lever arm and said indicator arm with a predetermined increased movement, electric circuits for energizing the electromagnets, a movable switch member, means carried by said lever arm to operate said switch member to alternately open and close the electric circuits for energizing opposing electromagnets and cause a constant swinging movement of said armature and the indicator arm which is operatively connected thereto.

CHARLES W. LINDSTROM.